US012026240B2

(12) United States Patent
Hassan et al.

(10) Patent No.: US 12,026,240 B2
(45) Date of Patent: Jul. 2, 2024

(54) DELEGATED AUTHENTICATION SYSTEMS AND TECHNIQUES

(71) Applicant: Microsoft Technology Licensing, LLC, Redmond, WA (US)

(72) Inventors: Amer A. Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1009 days.

(21) Appl. No.: 16/281,955

(22) Filed: Feb. 21, 2019

(65) Prior Publication Data

US 2020/0272716 A1 Aug. 27, 2020

(51) Int. Cl.
*G06F 21/32* (2013.01)
*G06F 21/34* (2013.01)
*G06V 40/16* (2022.01)
*H04L 9/40* (2022.01)

(52) U.S. Cl.
CPC .............. *G06F 21/32* (2013.01); *G06F 21/34* (2013.01); *G06V 40/166* (2022.01); *H04L 63/0861* (2013.01)

(58) Field of Classification Search
CPC ........ H04N 7/15; H04N 1/4406; H04N 1/442; G06F 21/31; G06F 21/32; G06F 21/34; G06F 21/60; G06F 21/604; G06F 21/62; G06F 21/6209; G06F 21/6218; H04L 65/403; H04L 63/0861; H04L 63/0884; H04L 63/10; G06V 40/166
See application file for complete search history.

(56) References Cited

U.S. PATENT DOCUMENTS

| | | | |
|---|---|---|---|
| 6,970,582 B2 | 11/2005 | Langley | |
| 8,296,573 B2 | 10/2012 | Bolle et al. | |
| 9,147,047 B1 | 9/2015 | Grun et al. | |
| 10,303,866 B1* | 5/2019 | Van Os | G06V 40/67 |
| 2006/0104485 A1 | 5/2006 | Miller et al. | |
| 2009/0210491 A1* | 8/2009 | Thakkar | H04L 12/1822 709/204 |
| 2012/0293599 A1 | 11/2012 | Norlin et al. | |

(Continued)

OTHER PUBLICATIONS

"International Search Report and Written Opinion Issued in PCT Application No. PCT/US20/017389", dated May 27, 2020, 10 Pages.

(Continued)

*Primary Examiner* — Jeremy S Duffield
(74) *Attorney, Agent, or Firm* — Schwegman Lundberg & Woessner, P.A.

(57) ABSTRACT

Systems and methods may be used to authenticate a user using a first device (e.g., a collaboration device) and a second device (e.g., a device proximate to the collaboration device) For example, the first device may compare an authentication image of a user (captured by the second device) to an image captured by the first device (for example at a lower resolution or with a partial view). The user may be authenticated by the first device in response to identifying the user from the authentication image (e.g., by matching the authentication image to a reference image of the user) and determining a correlation between the authentication image and the captured image.

20 Claims, 5 Drawing Sheets

(56) References Cited

U.S. PATENT DOCUMENTS

| | | | |
|---|---|---|---|
| 2013/0015946 A1* | 1/2013 | Lau | G06V 40/172 |
| | | | 340/5.2 |
| 2013/0337771 A1 | 12/2013 | Klein et al. | |
| 2014/0347511 A1* | 11/2014 | Rodriguez-Serrano | |
| | | | H04N 23/64 |
| | | | 348/222.1 |
| 2015/0138302 A1* | 5/2015 | Sethi | H04N 7/15 |
| | | | 348/14.07 |
| 2015/0271206 A1* | 9/2015 | Schultz | H04L 63/20 |
| | | | 726/3 |
| 2016/0140396 A1* | 5/2016 | Feng | G06T 7/20 |
| | | | 348/14.08 |
| 2016/0232401 A1 | 8/2016 | Hoyos et al. | |
| 2016/0254845 A1* | 9/2016 | Iura | G06F 3/0488 |
| | | | 455/41.2 |
| 2016/0267319 A1 | 9/2016 | Murillo et al. | |
| 2017/0103487 A1* | 4/2017 | Channah | G06Q 50/265 |
| 2017/0149771 A1* | 5/2017 | Vincent | H04W 76/14 |
| 2017/0272263 A1* | 9/2017 | Riley | H04N 7/15 |
| 2017/0295014 A1* | 10/2017 | Baras | H04L 9/3231 |
| 2017/0318014 A1* | 11/2017 | Korus | G06F 21/32 |
| 2018/0181737 A1 | 6/2018 | Tussy | |
| 2020/0105111 A1* | 4/2020 | Messer | G08B 13/19663 |

OTHER PUBLICATIONS

Sarkar, Ankit, "Preserving Freshness and Continuity in Remote Biometric Authentication", In Thesis Submitted for the Degree of Master of Science, Department of Computer Science, School of Computing, National University of Singapore, Aug. 2016, 64 Pages.

* cited by examiner

DELEGATED AUTHENTICATION SYSTEMS AND TECHNIQUES

BACKGROUND

Meeting room devices, such as a collaboration device (e.g., a computer, a tablet, or other device with computing capabilities and a screen or camera), may be used to attempt to perform facial recognition or other biometric authentication. However, these devices may not capture sufficient information to successfully authenticate a user (e.g., blurred or incomplete images, too few pixels in authentication portion of image, etc.). One issue that arises is that the distance between the meeting room device and the user makes these biometric captures difficult and less accurate. Another issue is that it may be awkward for a user to stand near enough to a meeting room device to accurately capture an authenticatable image.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
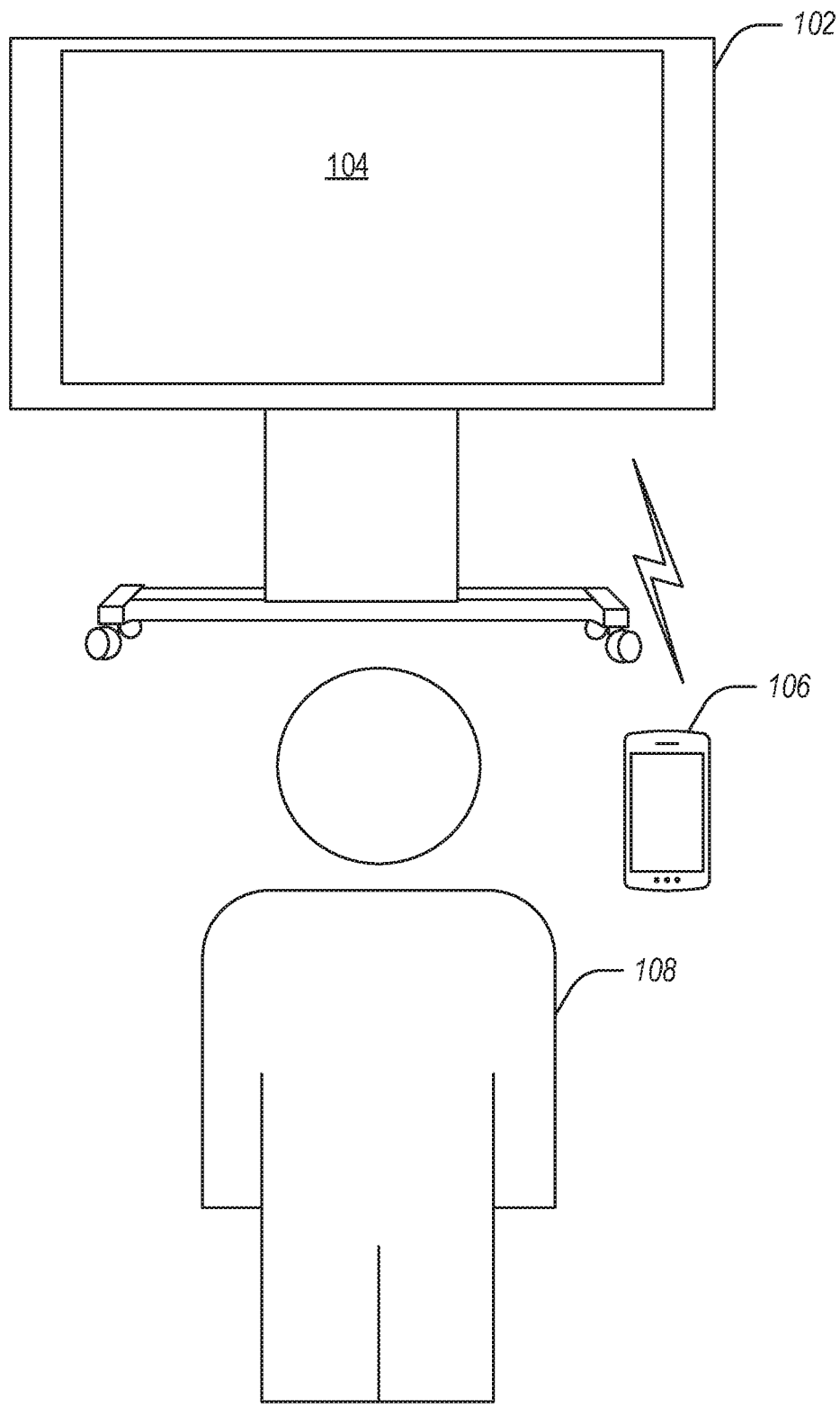
FIG. 1 illustrates a collaboration space including devices for authenticating a user in accordance with some embodiments.

Systems and methods for authenticating a user are described herein. In an example, a user device (such as a phone, tablet, laptop or desktop computer, smart watch, etc.) captures a biometric image (e.g., of a face) and sends it to a collaboration device for verification. The collaboration device may be a meeting room device, such as the Surface Hub from Microsoft of Redmond, Washington. The collaboration device may perform facial recognition or other biometric authentication for authenticating a user. However, authenticating the user using only the collaboration device may be difficult due to location of the collaboration device (e.g., if the collaboration device is mounted or located across a desk, table, or the room), distance between the user and the collaboration device, awkwardness of use (e.g., it may be awkward for the user to stand in front of the collaboration device in front of others), or the like. These issues may make biometric captures difficult or less accurate. A user device may be used to capture a biometric image, which may then be sent to the collaboration device for verification. In an example, to verify that the device did not use a pre-stored picture or exploit some other security flaw, the collaboration device may compare an image capture by the collaboration device with the user device captured image to determine whether the image from the user device is a recent picture (e.g., captured within a timeframe, or of a substantially similar image, or the like).

The systems and methods described herein may be used to authenticate a user for a collaboration device. For example, an authentication session may be established using the collaboration device and a proximate device (e.g., a mobile device such as a phone or tablet, a computer, or other non-collaboration device). An authentication session may include an authenticated call session, receiving access to resources such as files or applications, access to a secure server or device, access to a secure video or audio call, or the like. The authentication session may be initiated at the collaboration device or the proximate device. An authentication image may be taken by the proximate device, which may then be compared to an image captured by the collaboration device. This comparison may be performed at the collaboration device, the proximate device, or another device such as a remote server. The user may be authenticated in response to determining a correlation between the authentication image and the image captured by collaboration device.

In an example, the systems and techniques described herein may be used to improve an authentication level of a user by using a trusted device (e.g., a collaboration device) to perform authentication to verify biometric or image data obtained via a un-trusted device (e.g., a different device which is located proximate to the collaboration device). To verify that the proximate device did not use a pre-stored picture or attempt to exploit some other security flaw, the collaboration device may compare its captured image with the proximate device's authentication image to determine whether the proximate device captured image is a recent picture (e.g., within a timeout window). The proximate device is used for easier access by the user to perform verification, or when a camera of the collaboration device does not have an angle or view needed to obtain an authentication image successfully. In other examples, the collaboration device may have a partial view or lower resolution data than the proximate device.

FIG. 1 illustrates an environment 100 including devices for authenticating a user 108 in accordance with some embodiments. The environment 100 includes a collaboration device 102, which includes a display screen 104 for presenting a user interface. The environment 100 may include a user 108, and a proximate device 106 (here illustrated as a mobile phone, but in other examples may include a tablet, a smart device, such as a watch, a laptop or desktop computer, a smart remote control, a thermostat, a video camera, a smart speaker/hub, or the like). The proximate device 106 may be used to capture an authentication image of the user 108. The authentication image may be sent to the collaboration device 102, which may also capture an image. The authentication image and the image captured by the collaboration device 102 may be compared to determine whether to authenticate the user 108.

In an example, the authentication determination may be initiated by the user 108 at a user interface displayed on the display screen 104 of the collaboration device 102. In another example, the authentication determination may be initiated at the proximate device 106. In yet another example, the authentication determination may be initiated automatically. For example, when the user 108 or the proximate device 106 are within range of the collaboration device 102, when a connection is made on the collaboration device 102, when a wireless connection is made (e.g., over Wi-Fi, Bluetooth, near field communication (NFC), or the like) between the collaboration device 102 and the proximate device 106, or the like.

When an authentication session is initiated, whether at the proximate device 106, the collaboration device 102, or otherwise, an image captured by the proximate device 106 is compared to an image captured by the collaboration device 102. In an example, this comparison may occur on the collaboration device 102, the proximate device 106, or a remote device. When the comparison results in a correlation between the two images, the user 108 may be authenticated. In an example, authenticating the user 108 may result in access on the collaboration device 102 or the proximate device 106 of resources such as files or applications, access to a secure server or device, access to a secure video or audio call, or the like.

Comparing the two images may include determining whether a threshold number of facial features match between the two images. When authenticating the user 108, a high threshold may be used when comparing the image taken by the proximate device 106 (the authentication image) to a stored image to actually authenticate the user 108. When checking the authentication (e.g., checking the proximate device 106), the threshold may be lower to compare the authentication image to an image captured by the collaboration device 102.

In some examples, additional actions may be taken to supplement or replace comparing the authentication image to the captured image. For example, multiple images may be used, such as comparing two sets of two images each of authentication and captured images, or multiple images may be used to generate a composite image for use as a captured image to compare to the authentication image. In an example, other captured information may be used, such as video, audio (e.g., spoken by the user 108 or background audio), biometrics (e.g., fingerprint), or the like.

In an example, the collaboration device 102 and the proximate device 106 may be in communication using an initial connection, such as Bluetooth or Wi-Fi, and may then communicate over other protocols after initialization, such as via 4G/5G or other wireless network protocols, the internee, or wired connections. In other example, an initial connection is not required. In yet another example, the collaboration device 102 and the proximate device 106 may communicate over Bluetooth or Wi-Fi for a duration of an authentication process. In still another example, near field communication (NFC) may be used. In this example, the NEC communication may guarantee a certain proximity of the proximate device 106 to the collaboration device 102, resulting in a usable captured image of the collaboration device 102.

Figure 2:
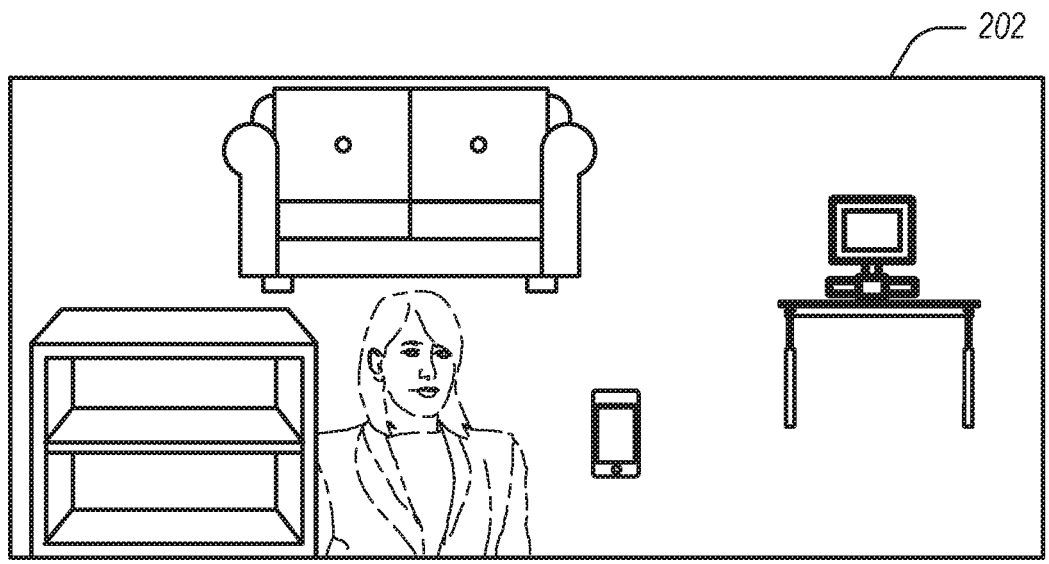
FIG. 2 illustrates an authentication image and a limited or captured image in accordance with some embodiments.
Figure 2:

FIG. 2 illustrates an authentication image 204 of a user and a limited or captured image 202 in accordance with some embodiments. The authentication image 204 may be captured by a mobile device, such as a cell phone, tablet, laptop, wearable, or the like or a desktop computer. The limited or captured image 202 may be captured by a collaboration device, or the like. The limited or captured image 202 depicts the environment (e.g., around the user). Thus, the limited or captured image 202 may have a larger capture area or more pixels or data, but may only capture the user in a small portion of the image, resulting in an image that is more difficult (than the authentication image 204) or impossible to authenticate the user.

As illustrated in FIG. 2, the authentication image 204 includes a clear view of a user with the user taking up a large portion of the image. The limited or captured image 202, in contrast, includes a less clear or smaller view of the user, with the user taking up less of the image. While the user is still visible in the limited or captured image 202, authenticating the user by comparing facial features to a reference image of the user may be more difficult (or impossible) with the limited or captured image 202 than with the authentication image 204.

Authenticating the user may include a two-step process. In one step, the authentication image 204 may be used to authenticate the user by comparing the authentication image 204 to a reference image (not shown) of the user. In another step, the authentication image 204 may be compared to the limited or captured image 202, and when a correlation between the authentication image 204 and the limited or captured image 202 is determined, the user may be authenticated. In an example, the authentication image 204 is captured by an untrusted device, while the limited or captured image 202 is captured by a trusted device. Thus, the user is authenticated using an image captured by the untreated device, and the untrusted device is verified as trustable using a trusted device. These actions in the two-step process may be taken individually (e.g., on separate devices) or together on a single device, and may be taken in any order.

In an example, facial features of the user are compared in the authentication image 204 to both a reference image and the limited or captured image 202. In an example, a higher threshold for authentication may be used in comparing to the reference image than the limited or captured image 202. For example, all or substantially all of tested facial features may be required for authenticating against the reference image, while only a majority, such as 75 percent, of tested facial features may be required for authenticating against the limited or captured image 202. Other thresholds may be used as desired. In another example, other techniques to correlate two images may be used.

Figure 3:
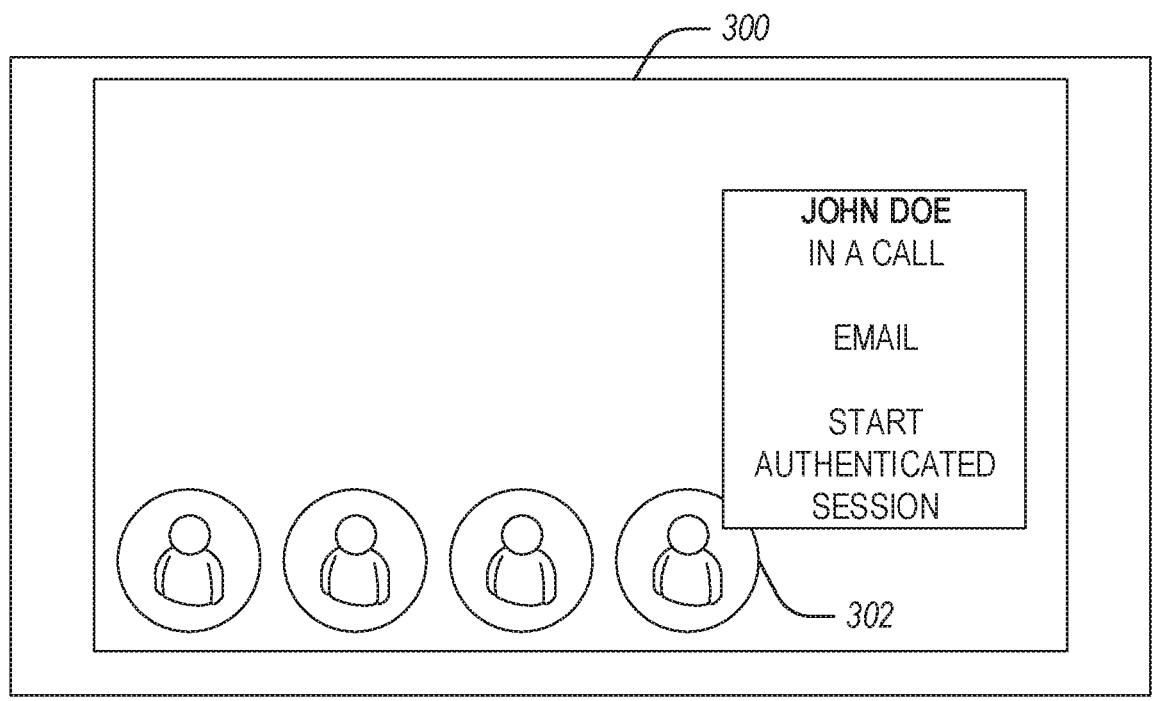
FIG. 3 illustrates an authentication user interface in accordance with some embodiments.

FIG. 3 illustrates an authentication user interface 300 in accordance with some embodiments. The authentication user interface 300 may be displayed on a collaboration device, a device proximate the collaboration device, or a device remote from the collaboration device. The authentication user interface 300 includes a user selectable icon 302. The icon 302 may include an image of a user. When a user hovers over the icon 302 or selects the icon 302 (e.g., using a mouse, a touch, or the like), additional information may be displayed, including an option to initiate an authentication session. The icon 302 may be operated by the user depicted or referenced in the details of the icon 302 or the additional information displayed, or by a second user. Regardless of which user operates the icon 302, the authentication session may be initiated by contacting a device of the user depicted or referenced by the icon 302 or the additional information.

When the icon 302 is an image or information related to the user the user's proximate device may be used to authenticate the user. When the icon 302 is another user's, the other user may receive a request to begin an authentication session at the collaboration device. An authentication session may include sharing files, sharing live video or audio, or granting permission to access resources (e.g., an application).

Figure 4:
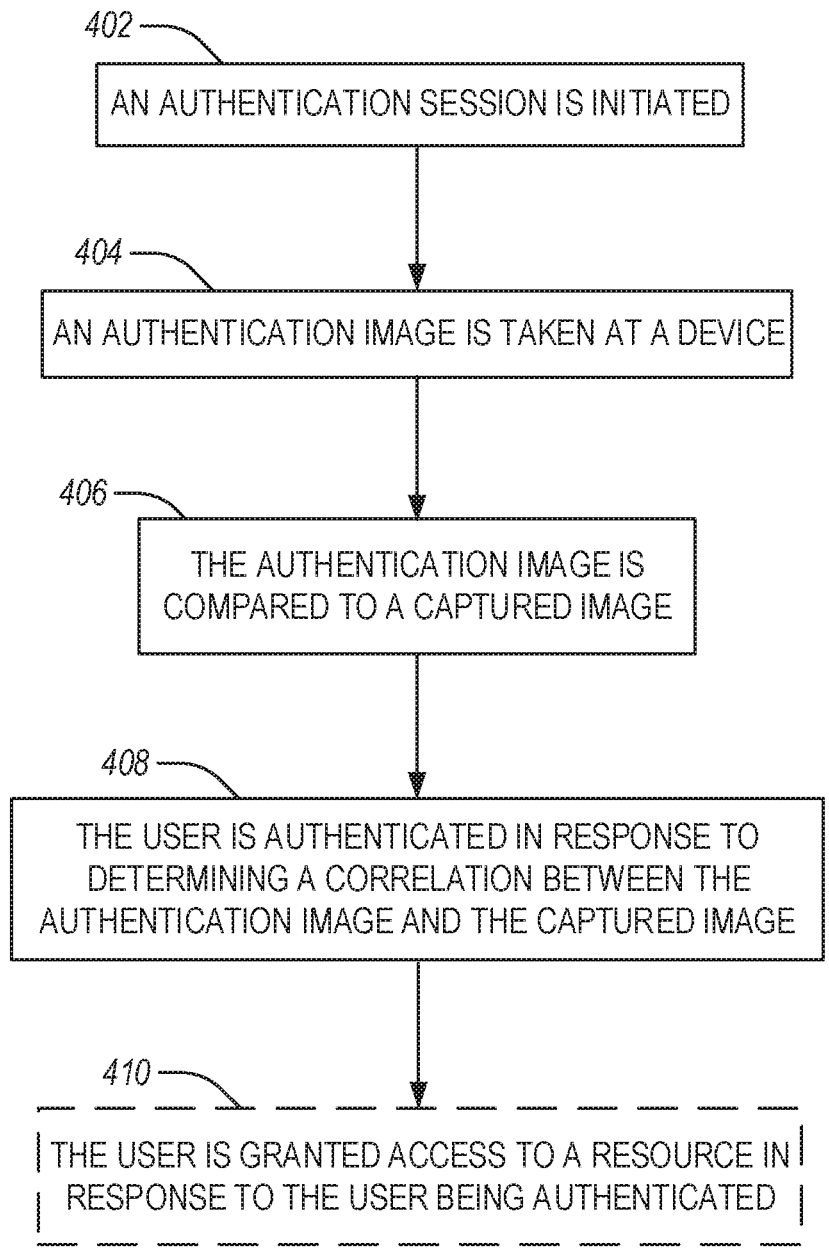
FIG. 4 illustrates a flowchart showing a technique for authenticating a user in accordance with some embodiments.

FIG. 4 illustrates a flowchart showing a technique 400 for authenticating a user in accordance with some embodiments.

The technique 400 includes an operation 402 where an authentication session is initiated. The authentication session may be initiated at a collaboration device (e.g., a video conferencing device or hub, a smart board, etc.), a proximate device (e.g., a phone, a tablet, a laptop, or the like), or a remote device (e.g., a phone, tablet, computer, etc. not within proximity (e.g., same room or within a wireless protocol distance) of the collaboration device). The authentication session may be initiated in response to a camera detecting motion or presence of a face (e.g., at the collaboration device) or by a user instruction. The user instruction may include a voice command, a selection on a user interface, a preselected automatic action (for example, when a phone is proximate the collaboration device, initiate), or the like. A user interface for authentication may be displayed on the collaboration device, the proximate device, the remote device, or some combination of these three (for example, first on the collaboration device and then switching to the proximate device after a user selection).

In an example, the authentication session is initiated by a user selection of a user's face (e.g., their own or another user's to collaborate with) on a user interface of the collaboration device or the proximate device. In another example, the authentication session is initiated in response to receiving a touch input indication on an icon of the user on a display screen of the collaboration device. The proximate device may be associated with the user. The proximate device may be identified based on the touch input indication on the icon. For example, the proximate device may be registered to a user in a system, the system connected with collaboration device, and on selection of the icon associated with the user on the collaboration device's user interface, the proximate device may be identified (and may be sent instructions in response).

The technique 400 may include sending, from the collaboration device, a request for an authentication image to be taken at the proximate device. In an example, the request may be sent using a Bluetooth or a Wi-Fi protocol. In another example, the request may be sent using near field communication (NTT), Other communication protocols may be used, such as cellular or wired connections. In an example, only an initial or first few messages (e.g., establishing a connection or sending an initial request) may be performed using Bluetooth or Wi-Fi, while remaining communications may use more convenient protocols for communication.

The technique 400 includes an operation 404 where an authentication image is taken (e.g., in real-time or within a timeout threshold limit) at a device (e.g., a proximate device). Operation 404 may be performed in response to the collaboration device sending a request for the authentication image to the proximate device. The authentication image may be sent to the collaboration device or a remote device (e.g., a server) for further actions as described below. In another example, the additional actions described below may be performed by the proximate device (e.g., after receiving an image captured by the collaboration device). The authentication image may be taken using a camera of the proximate device. The authentication image may be of a higher quality, higher pixel density, sharper, clearer, better focused, higher resolution, or fuller view of the user (e.g., the user's face) than an image captured by the collaboration device. In another example, the authentication image or the captured image may not be images, but instead information captured from an image taken using a camera of a device.

The technique 400 includes an operation 406 where the authentication image is compared to an image captured by the collaboration device. In an example, the comparison may be performed on the collaboration device or a remote device after receiving the authentication image from the proximate device. The comparison may include comparing a set of facial features in the authentication image to a set of facial features in the captured image. Operation 406 may include using a moving average subset of pixels of the captured image. In an example, the initial captured image may be large, for example with only a subset of pixels or image portion actually capturing a relevant authentication portion of the space (e.g., a user's face). In this example, subsets of pixels may be scanned until the relevant portion of the image is found. One technique for finding the relevant portion includes using a moving average. In another technique, the initial captured image may be divided into subportions, and a subportion with the most facial features may be selected and used for the comparison. In still another technique, multiple subimages may be compared to the authentication image. In an example, the captured image may include only a partial view or lower resolution data compared to the authentication image.

In an example, the collaboration device may attempt to authenticate the user with a captured image, but determine that the captured image includes only a partial view of the user, low resolution data or other deficiency that renders the captured image unusable for authenticating the user. When the collaboration device determines that the captured image is a partial view or of low resolution, the collaboration device may initiate a request to a proximate device to cause capturing of an authentication image. Further authentication may be performed, based on a comparison of the captured image and the image from the device, and access may be selectively granted depending on the authentication result.

The technique 400 includes an operation 408 where the user is authenticated in response to determining a correlation between the authentication image and the captured image. The user may be first authenticated by identifying the user from the authentication image, such as by matching the authentication image to a reference image of the user (e.g., by matching portions of the user's face in the authentication image to portions of the user's face in the reference image). Then, as a second layer of security, the user may be authenticated by determining the correlation. This allows for an entrusted device (e.g., a proximate device) to be used in the authentication process (while establishing a measure of trust with the proximate device by using the correlation).

In an example, a correlation between the two images may be determined when a threshold number of facial features match between the two images. In an example, authenticating the user includes determining whether a timeout corresponding to the authentication session has expired before determining the correlation. For example, a timeout time may be set when the authentication session is initiated, and the comparing and authenticating may need to be completed before the timeout time is reached.

In an example, authenticating the user may include comparing a voice sample, video sample, or other biometric sample (e.g., fingerprint, retina scan, facial representation) in addition to or instead of the two images. For example, video, audio, or biometrics may be captured at both the proximate device and the collaboration device, and compared. The techniques described herein may be used with audio, video, or biometrics in addition to or replacing images, because the problem solved by these techniques is also present in those examples. The image taken by the collaboration device may not be of sufficient resolution or contain enough data to accurately authenticate a user (or it may be awkward for the user to position their face close enough to a camera of the collaboration device). Similarly, a video, audio, or biometrics may be difficult to obtain accurately at the collaboration device.

The technique 400 includes an optional operation 410 where the user may be granted access to a resource in response to the user being authenticated. For example, authenticating the user may result the user being granted access on the collaboration device or the proximate device of a resource such as a file or application, access to a secure server or device, access to a secure video or audio call, access to a particular user profile, or the like.

In an example, means for processing, comparing, authenticating, identifying, determining, or providing resources may be provided by instructions executed via a processor and memory, for example of a computing device (e.g., a collaboration device or a proximate device). In an example, means for receiving may include communication circuitry (e.g., as described below related to FIG. 5). The means for providing the user access to a system resource in response to authenticating the user may be provided by a processor granting access to a memory location within a memory of a device or server, allowing access to communication circuitry to access a port or connect with another device (e.g., on a secure connection), or the like.

Figure 5:
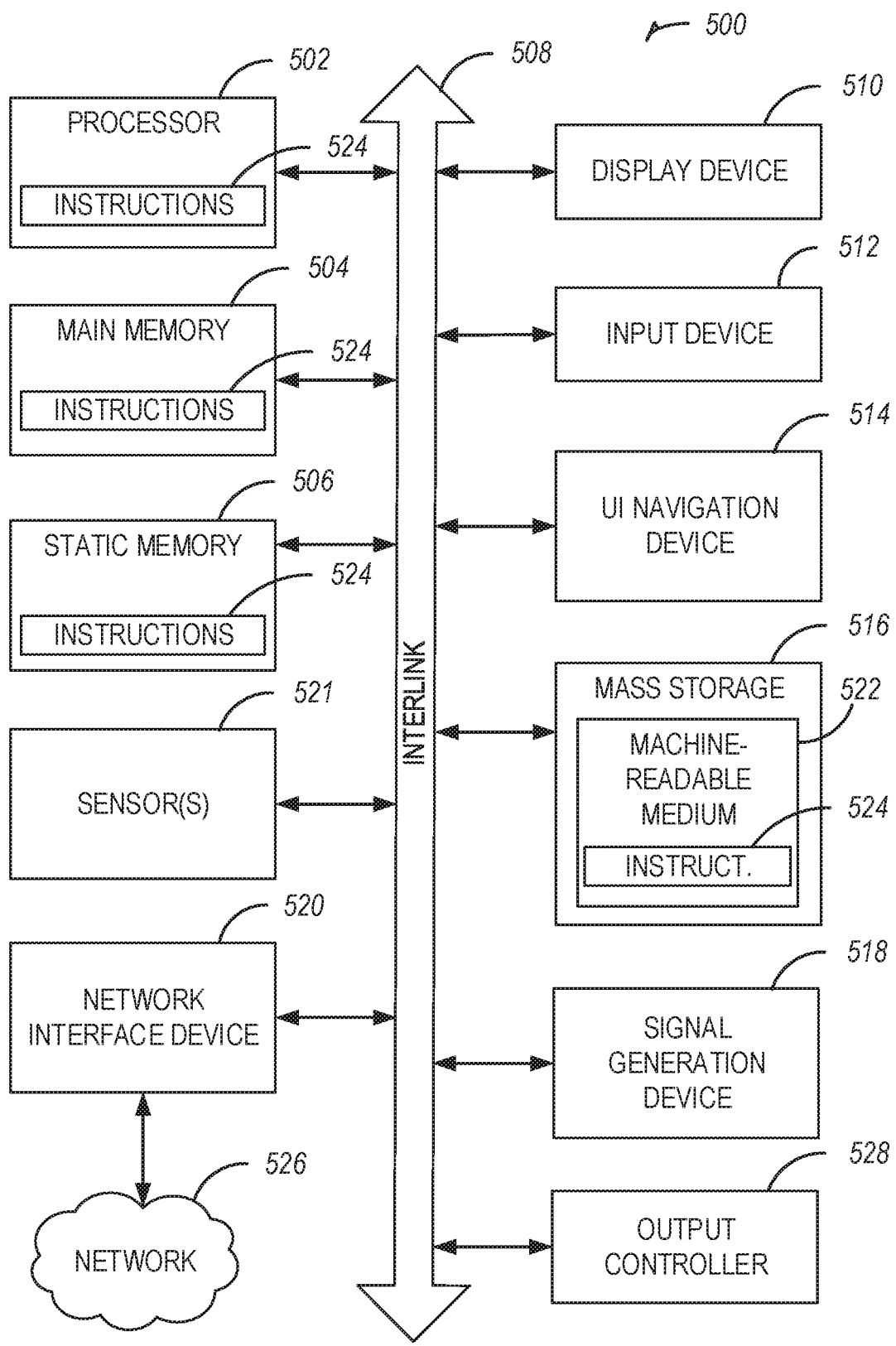
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, conference call device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (UPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory; such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (LAM), hypertext transfer protocol (HTTP), etc.). Example communication networks may include a local area network (LAN), a wide area network (WAN), a packet data network (e.g., the Internet), mobile telephone networks (e.g., cellular data networks), Plain Old Telephone (POTS) networks, and wireless data networks (e.g., Institute of Electrical and Electronics Engineers (IEEE) 802.11 family of standards known as Wi-Fi®, 4G (e.g., Long Term Evolution (LTE)) or 5G networks), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIM), multiple-input multiple-output (MIMO), or multiple-input single-output (NTISO) techniques. The term "transmission medium" shall be taken to include any intangible medium that is capable of storing, encoding or carrying instructions for execution by the machine 500, and includes digital or analog communications signals or other intangible medium to facilitate communication of such software.

Each of these non-limiting examples may stand on its own, or may be combined in various permutations or combinations with one or more of the other examples.

Example 1 is a method for authenticating a user comprising: processing a request for an authentication session at a processor of a first device; receiving an authentication image of a user from the second device, the authentication image taken at the second device; causing an authentication operation by: comparing the authentication image to an image of the user captured by the first device; authenticating the user in response to: identifying the user by matching the authentication image to a reference image of the user; and determining a correlation between the authentication image and the captured image; and providing the user access to a system resource in response to authenticating the user.

In Example 2, the subject matter of Example 1 includes, wherein the authentication session is initiated in response to receiving a touch input indication on an icon of the user on a display screen of the first device.

In Example 3, the subject matter of Example 2 includes, wherein the second device is associated with the user and identified based on the touch input indication on the icon.

In Example 4, the subject matter of Examples 1-3 includes, wherein the authentication session is initiated in response to receiving an indication from the second device.

In Example 5, the subject matter of Examples 1-4 includes, wherein sending the request to the second device includes wirelessly sending the request using a Bluetooth or Wi-Fi protocol.

In Example 6, the subject matter of Examples 1-5 includes, wherein comparing the authentication image to the captured image includes comparing a set of facial features in the authentication image to a set of facial features in the captured image.

In Example 7, the subject matter of Example 6 includes, wherein determining the correlation includes determining that a threshold number of facial features match between the set of facial features in the authentication image and the set of facial features in the captured image.

In Example 8, the subject matter of Examples 1-7 includes, wherein comparing the authentication image to the captured image includes using a moving average subset of pixels of the captured image.

In Example 9, the subject matter of Examples 1-8 includes, wherein authenticating the user includes comparing a voice sample captured by the second device with a voice sample captured by the first device.

In Example 10, the subject matter of Examples 1-9 includes, wherein authenticating the user includes comparing a video captured by the second device with a video captured by the first device.

In Example 11, the subject matter of Examples 1-10 includes, wherein authenticating the user includes determining whether a timeout corresponding to the authentication session has expired before determining the correlation.

In Example 12, the subject matter of Examples 1-11 includes, wherein the captured image includes only a partial view or lower resolution data compared to the authentication image.

In Example 13, the subject matter of Examples 1-12 includes, wherein the first device is a trusted device and the second device is an untrusted device.

Example 14 is a system for authenticating a user comprising: a first device including a processor to: cause a limited image of a user to be captured, the limited image having a partial view or lower resolution view of the user than the authentication image; compare an authentication image of the user, captured by a second device, to the limited image; authenticate the user in response to: identifying the user by matching the authentication image to a reference image of the user; and determining a correlation between the authentication image and the limited image; and provide the user access to a system resource in response to authenticating the user.

In Example 15, the subject matter of Example 14 includes, wherein to compare the authentication image to the captured image, the first device is further configured to compare a set of facial features in the authentication image to a set of facial features in the captured image.

In Example 16, the subject matter of Examples 14-15 includes, wherein to authenticate the user, the first device is further to determine whether a timeout corresponding to an authentication session has expired before determining the correlation.

Example 17 is a first device for authenticating a user comprising: a processor and memory, including instructions, which when executed by the processor, cause the processor to perform operations to: process a request for an authentication session; receive an authentication image of a user from the second device, the authentication image taken at the second device; compare the authentication image to an image of the user captured by the first device; authenticate the user in response to: identifying the user by matching the authentication image to a reference image of the user; and determining a correlation between the authentication image and the captured image; and provide the user access to a system resource in response to authenticating the user.

In Example 18, the subject matter of Example 17 includes, wherein the authentication session is initiated in response to receiving a touch input indication on an icon of the user on a display screen of the first device.

In Example 19, the subject matter of Examples 17-18 includes, wherein the instructions to compare the authentication image to the captured image include instructions that cause the processor to: compare a set of facial features in the authentication image to a set of facial features in the captured image; and determine that a threshold number of facial features match between the set of facial features in the authentication image and the set of facial features in the captured image.

Example 20 is an apparatus for authenticating a user comprising: means for processing a request for an authentication session of a first device; means for receiving an authentication image of a user from the second device, the authentication image taken at the second device; means for comparing the authentication image to an image of the user captured by the first device; means for authenticating the user in response to: identifying the user by matching the authentication image to a reference image of the user; and determining a correlation between the authentication image and the captured image; and means for providing the user access to a system resource in response to authenticating the user.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for authenticating a user comprising:
   processing a request for an authentication session at a processor of a first device;
   capturing, using the first device, an image of the user;
   determining, using the first device, that the captured image is a limited image that is unusable for authentication with a stored reference image of the user;
   in response to determining that the captured image is unusable for authentication with the stored reference image of the user, initiating a request to a second device to cause capturing of an authentication image;
   receiving the authentication image of the user from the second device of the user, the authentication image taken at the second device;
   performing an authentication operation to provide the user with access to a system resource, the authentication operation comprising:
   determining if a first threshold condition is met based on a first set of facial features in the authentication image of the user from the second device and the stored reference image of the user, wherein the stored reference image of the user is different than the authentication image of the user and is usable for authentication; and
   determining if a second threshold condition is met based on a second set of facial features in the authentication image of the user from the second device and the captured image of the user from the first device, the second set of facial features different from the first set of facial features; and
   providing the user with access to the system resource in response to determining that the first and second threshold conditions are met.

2. The method of claim 1, wherein the authentication session is initiated in response to receiving a touch input indication on an icon of the user on a display screen of the first device.

3. The method of claim 2, wherein the second device is associated with the user and identified based on the touch input indication on the icon.

4. The method of claim 1, wherein the authentication session is initiated in response to receiving an indication from the second device.

5. The method of claim 1, comprising:
   sending a request to the second device for the authentication image of the user,
   wherein sending the request to the second device includes wirelessly sending the request using a Bluetooth or Wi-Fi protocol.

6. The method of claim 1, further comprising: determining a correlation between the authentication image and the captured image by comparing the second set of facial features in the authentication image to a corresponding set of facial features in the captured image.

7. The method of claim 6, wherein determining the correlation includes determining that a threshold number of facial features match between the second set of facial features in the authentication image and the corresponding set of facial features in the captured image.

8. The method of claim 1, further comprising: determining a correlation between the authentication image and the captured image by using a moving average subset of pixels of the captured image.

9. The method of claim 1, wherein performing the authentication includes comparing a voice sample captured by the second device with a voice sample captured by the first device or comparing a video captured by the second device with a video captured by the first device.

10. The method of claim 1, wherein performing the authentication includes determining whether a timeout corresponding to the authentication session has expired before determining a correlation.

11. The method of claim 1, wherein determining that the captured image is a limited image includes determining that the captured image contains only a partial view of the user's face, and
   wherein the captured image, the authentication image, and the stored reference image are each images.

12. The method of claim 1, wherein the first device is a trusted device and the second device is an untrusted device.

13. A first device for authenticating a user comprising:
   a processor and memory, including instructions, which when executed by the processor, cause the processor to perform operations to:
   capture, using the first device, an image of the user;
   process a request for an authentication session;
   determine, using the first device, that the captured image is a limited image that is unusable for authentication with a stored reference image of the user;
   initiate, in response to determining that the captured image is unusable for authentication with the stored reference image of the user, a request to a second device to cause capture of an authentication image;
   receive the authentication image of the user from the second device of the user, the authentication image taken at the second device;
   perform an authentication operation to provide the user with access to a system resource, the authentication operation, comprising:

determine if a first threshold condition is met based on a first set of facial features in the authentication image of the user from the second device and the stored reference image of the user, wherein the stored reference image of the user is different than the authentication image of the user and is usable for authentication; and determine if a second threshold condition is met based on a second set of facial features in the authentication image of the user from the second device and the captured image of the user from the first device, the second set of facial features different from the first set of facial features; and provide the user with access to the system resource in response to determining that the first and second threshold conditions are met.

14. The first device of claim 13, wherein to determine that the captured image is a limited image includes to determine that the captured image contains only a partial view of the user's face, and wherein the captured image, the authentication image, and the stored reference image are each images.

15. The first device of claim 13, wherein the authentication session is initiated in response to receiving a touch input indication on an icon of the user on a display screen of the first device, and wherein the second device is associated with the user and identified based on the touch input indication on the icon.

16. The first device of claim 13, further comprising instructions to determine a correlation between the authentication image and the captured image, the instructions to cause the processor to:

compare the second set of facial features in the authentication image to a corresponding set of facial features in the captured image; and determine that a threshold number of facial features match between the second set of facial features in the authentication image and the corresponding set of facial features in the captured image.

17. An apparatus for authenticating a user comprising:
means for capturing an image of the user;
means for processing a request for an authentication session of a first device;
means for determining that the captured image is a limited image that is unusable for authentication with a stored reference image of the user;
means for initiating, in response to determining that the captured image is unusable for authentication with the stored reference image of the user, a request to a second device to cause capturing of an authentication image;
means for receiving the authentication image of the user from the second device of the user, the authentication image taken at the second device;
means for authenticating the user to provide the user with access to a system resource in response to:

determining if a first threshold condition is met based on a first set of facial features in the authentication image of the user from the second device and the stored reference image of the user, wherein the stored reference image of the user is different than the authentication image of the user and is usable for authentication; and determining if a second threshold condition is met based on a second set of facial features in the authentication image of the user from the second device and the captured image of the user from the first device, the second set of facial features different from the first set of facial features; and means for providing the user with access to the system resource in response to determining that the first and second threshold conditions are met.

18. The method of claim 1, wherein determining that the captured image is a limited image includes determining that the captured image is a lower resolution view of the user's face compared to the authentication image.

19. The method of claim 1, wherein determining if the first threshold condition is met includes determining if a first threshold number of the first set of facial features in the authentication image of the user from the second device matches corresponding facial features in the stored reference image of the user, and wherein the system resource is associated with the first device.

20. The method of claim 19, wherein determining if the second threshold condition is met includes determining if a second threshold number of the second set of facial features in the authentication image of the user from the second device matches corresponding facial features in the captured image of the user from the first device, and wherein providing the user access to the system resource comprises providing the user access to the system resource associated with the first device in response to determining that the first threshold number of facial features in the authentication image matches corresponding features in the stored reference image and that the second threshold number of facial features in the authentication image matches corresponding features in the captured image.

* * * * *